US012183231B1

(12) United States Patent
Yu et al.

(10) Patent No.: US 12,183,231 B1
(45) Date of Patent: Dec. 31, 2024

(54) DISPLAY DRIVING CIRCUIT INCLUDING SOURCE DRIVER SENSING NOISE OCCURRENCE AND METHOD FOR DRIVING DISPLAY PANEL

(71) Applicant: Novatek Microelectronics Corp., Hsinchu (TW)

(72) Inventors: Hsi-Mao Yu, Hsinchu County (TW); Te-Hsien Kuo, Keelung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/479,124

(22) Filed: Oct. 2, 2023

(51) Int. Cl.
*G09G 3/00* (2006.01)

(52) U.S. Cl.
CPC ......... *G09G 3/006* (2013.01); *G09G 2310/08* (2013.01); *G09G 2330/06* (2013.01); *G09G 2360/12* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/3275; G09G 3/3283; G09G 3/3291
USPC ..................................................... 345/76–83
See application file for complete search history.

(56) References Cited

U.S. PATENT DOCUMENTS 9,208,732 B2 12/2015 Kim et al.
9,583,070 B2 2/2017 Lin et al.
9,947,286 B2 4/2018 Lin
11,017,740 B2 * 5/2021 Hu .......................... G09G 5/008
2010/0225637 A1 * 9/2010 Jeon .......................... G09G 3/20 345/213
2013/0050176 A1 2/2013 Kim et al.
2014/0062994 A1 * 3/2014 Chen .................... G09G 3/3688 345/214
2015/0062105 A1 * 3/2015 Park .......................... G09G 3/36 345/212
2015/0062110 A1 * 3/2015 Oh ....................... G09G 3/2096 345/99
2016/0118013 A1 4/2016 Lin
(Continued)

FOREIGN PATENT DOCUMENTS

TW 201310434 3/2013
TW 201413692 4/2014
(Continued)

OTHER PUBLICATIONS

"Office Action of Taiwan Counterpart Application", issued on Aug. 20, 2024, p. 1-p. 6.

*Primary Examiner* — Ke Xiao
*Assistant Examiner* — Nelson Lam
(74) *Attorney, Agent, or Firm* — JCIPRNET

(57) ABSTRACT

A display driving circuit adapted to drive a display panel to display an image is provided. The display driving circuit includes a source driver circuit and a timing controller circuit. The source driver circuit is configured to sense whether noise occurs and output a lock signal. The lock signal indicates whether the noise occurs. The timing controller circuit is coupled to the source driver circuit, and configured to output image data to the source driver circuit and receive the lock signal from the source driver circuit. The timing controller circuit adjusts a data depth of the image data or a frame rate of the display panel when the lock signal indicates the noise occurs.

13 Claims, 8 Drawing Sheets

(56) References Cited

U.S. PATENT DOCUMENTS

| | | | | |
|---|---|---|---|---|
| 2016/0125840 | A1* | 5/2016 | Oh | G09G 5/006 345/76 |
| 2016/0284313 | A1 | 9/2016 | Lin et al. | |
| 2016/0379559 | A1 | 12/2016 | Yamaji | |
| 2020/0243041 | A1* | 7/2020 | Tzeng | G09G 5/008 |
| 2020/0258472 | A1* | 8/2020 | Hu | G09G 5/008 |
| 2021/0272489 | A1* | 9/2021 | Ishii | G09G 3/2003 |
| 2021/0280125 | A1 | 9/2021 | Kim et al. | |
| 2023/0005401 | A1* | 1/2023 | Jung | G06F 3/04182 |
| 2023/0215317 | A1* | 7/2023 | Kim | G09G 3/006 345/214 |

FOREIGN PATENT DOCUMENTS

| | | |
|---|---|---|
| TW | 201616471 | 5/2016 |
| TW | 201635263 | 10/2016 |

* cited by examiner

DISPLAY DRIVING CIRCUIT INCLUDING SOURCE DRIVER SENSING NOISE OCCURRENCE AND METHOD FOR DRIVING DISPLAY PANEL

BACKGROUND

Technical Field

The invention relates to a driving circuit and a method for driving a panel, and more particularly to a display driving circuit and a method for driving a display panel.

Description of Related Art

When a mobile phone or a radio frequency (RF) device is placed near the display, the external noise may disrupt the display driving circuit and cause reception errors in the source driver circuit, resulting in abnormal display. Typically, when the source driver circuit is affected by the external noise, the timing controller circuit will increase the signal transmission energy, e.g. signal swing, to improve the signal-to-noise ratio. However, increasing the signal swing in certain models may not solve the issue of external noise interference.

SUMMARY

The invention is directed to a display driving circuit and a method for driving a display panel, capable of solving the issue of external noise interference to improve the signal quality and increase the signal-to-noise ratio.

An embodiment of the invention provides a display driving circuit adapted to drive a display panel to display an image. The display driving circuit includes a source driver circuit and a timing controller circuit. The source driver circuit is configured to sense whether noise occurs and output a lock signal. The lock signal indicates whether the noise occurs. The timing controller circuit is coupled to the source driver circuit, and configured to output image data to the source driver circuit and receive the lock signal from the source driver circuit. The timing controller circuit adjusts a data depth of the image data or a frame rate of the display panel when the lock signal indicates the noise occurs.

An embodiment of the invention provides a method for driving a display panel. The method includes: sensing whether noise occurs and output a lock signal, wherein the lock signal indicates whether the noise occurs; adjusting a data depth of an image data when the lock signal indicates the noise occurs; and driving the display panel to display an image according to the image data.

An embodiment of the invention provides a method for driving a display panel. The method includes sensing whether noise occurs and output a lock signal, wherein the lock signal indicates whether the noise occurs; adjusting a frame rate of the display panel when the lock signal indicates the noise occurs; and driving the display panel to display an image according to the frame rate.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
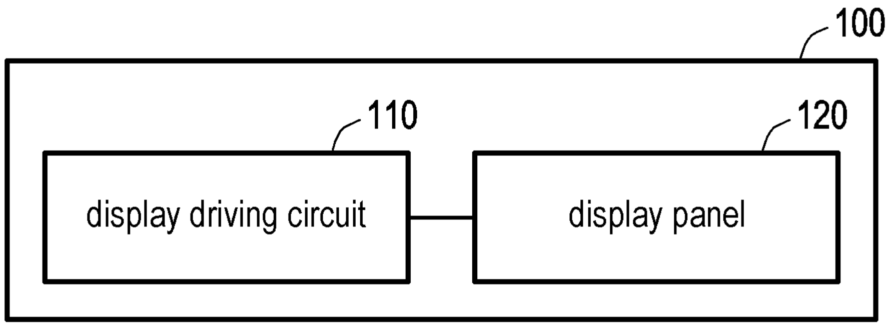
FIG. 1 is a schematic block diagram illustrating a display device according to an embodiment of the invention.
Figure 2:
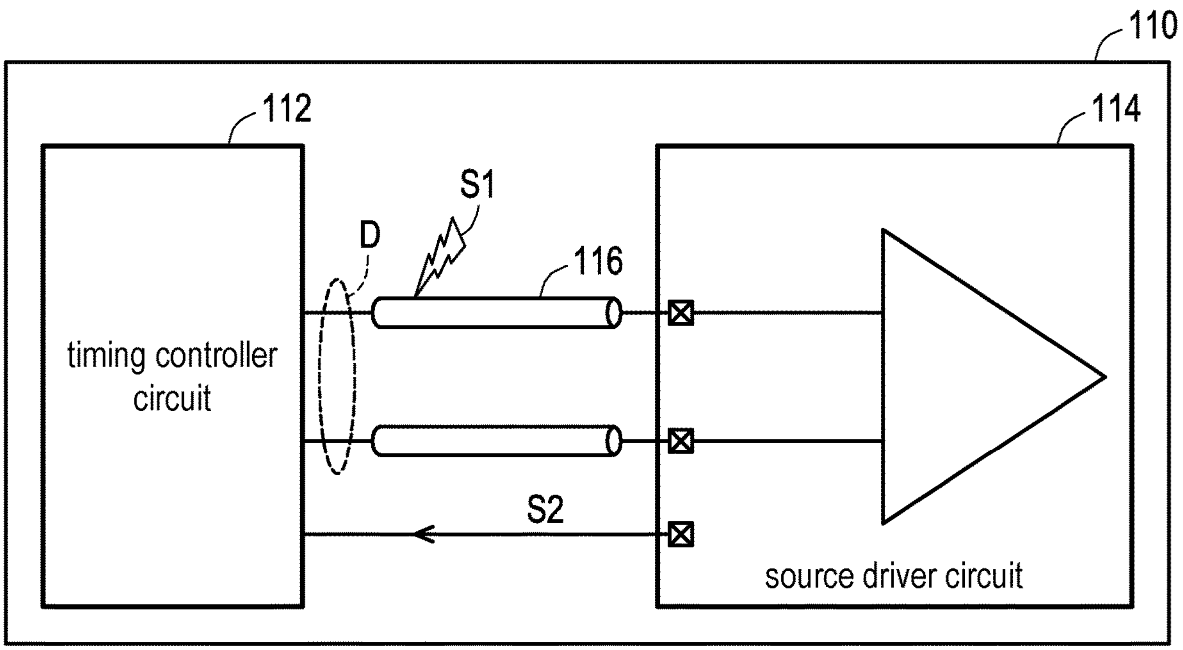
FIG. 2 is a schematic diagram illustrating a display driving circuit of FIG. 1 according to another embodiment of the invention.

FIG. 1 is a schematic block diagram illustrating a display device according to an embodiment of the invention. FIG. 2 is a schematic diagram illustrating a display driving circuit of FIG. 1 according to another embodiment of the invention. Referring to FIG. 1 and FIG. 2, a display device 100 includes a display driving circuit 110 and a display panel 120. The display driving circuit 110 is adapted to drive the display panel 120 to display an image. In an embodiment, the display driving circuit 110 may be a display driver integrated circuit (IC).

The display driving circuit 110 includes a timing controller circuit 112 and a source driver circuit 114. The timing controller circuit 112 is coupled to the source driver circuit 114. The timing controller circuit 112 outputs image data D to the source driver circuit 114. The source driver circuit 114 receives the image data D from the timing controller circuit 112 via transmission lines 116, and drives the display panel 120 to display the image according to the image data D. The hardware structures of the timing controller circuit 112 and the source driver circuit 114 can be obtained with reference to common knowledge in the related art.

In the present embodiment, the source driver circuit 114 senses whether noise S1 occurs and feeds back a lock signal S2 to the timing controller circuit 112. The timing controller circuit 112 receives the lock signal S2 from the source driver circuit 114. The lock signal S2 indicates whether the noise S1 occurs. Once the noise S1 occurs, signal quality of the image data D is affected. To improve the signal quality and increase the signal-to-noise ratio, the timing controller circuit 112 may adjust a data depth of the image data D or a frame rate of the display panel 120 when the lock signal S2 indicates the noise S1 occurs.

In an embodiment, the timing controller circuit 112 outputs a clock signal to the source driver circuit 114 for clock training. The source driver circuit 114 senses whether the noise S1 occurs based on head data of the clock signal from the timing controller circuit 112. For example, the signal or data transmission between the timing controller circuit 112 and the source driver circuit 114 may comply with a specified protocol. When the noise S1 occurs, the head data of the clock signal changes and no longer complies with the specified protocol. The source driver circuit 114 can detect the change of the head data to determine whether the noise S1 occurs. To be specific, the head data "01" of the clock signal may be changed to "00", "10" or "11" due to interference of the noise S1, and it indicates the noise S1 occurs.

Figure 3:
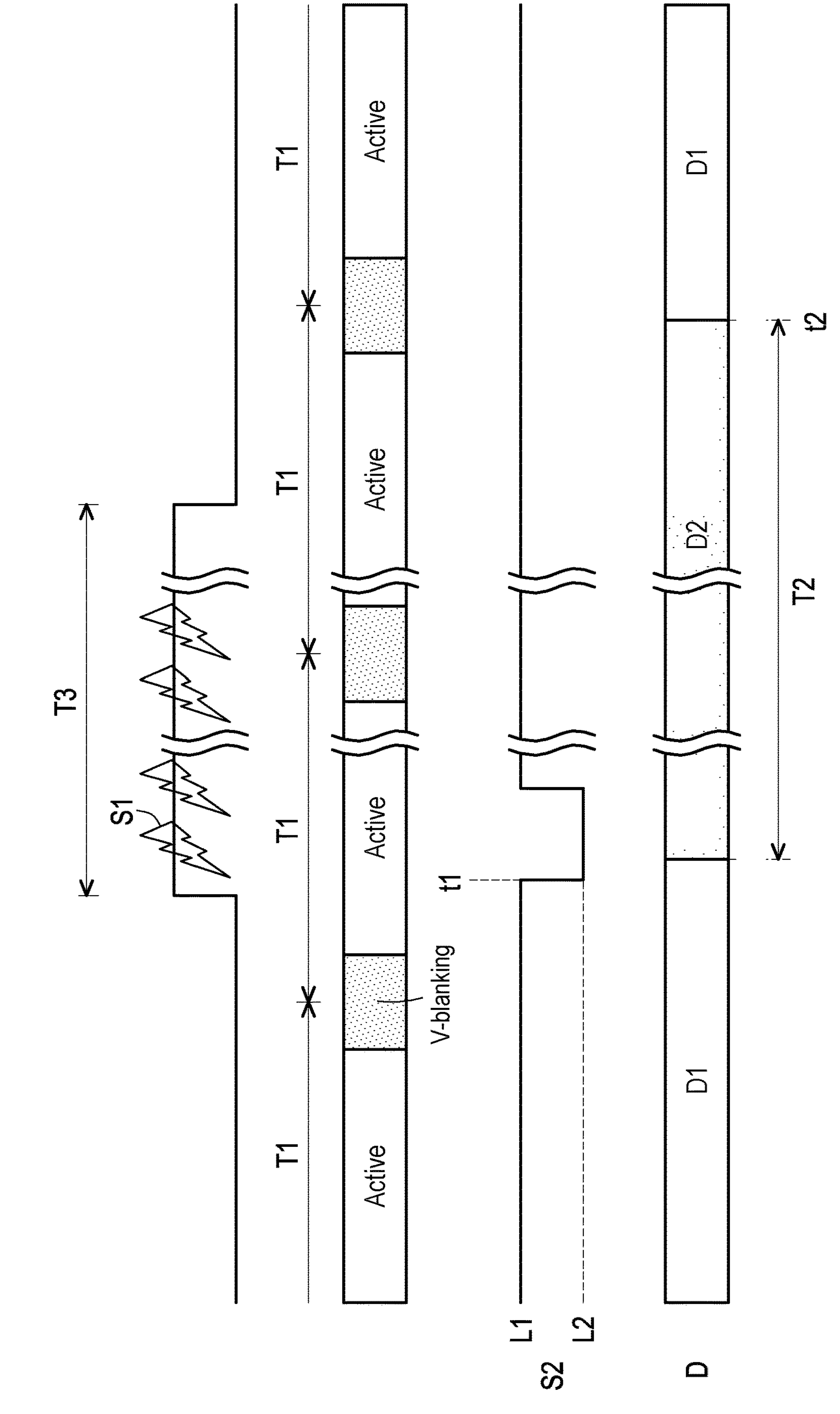
FIG. 3 is a schematic diagram illustrating signals and data of a display driving circuit according to an embodiment of the invention.

FIG. 3 is a schematic diagram illustrating signals and data of a display driving circuit according to an embodiment of the invention. Referring to FIG. 3, the source driver circuit 114 drives the display panel 120 to display image frames during frame periods T1. The frame period T1 includes an active period and a V-blanking period. The V-blanking period is divided into two parts that are located before and after the active period.

The lock signal S2 includes a first signal level L1 and a second signal level L2, and the second signal level L2 is lower than the first signal level L1. The first signal level L1 of the lock signal S2 indicates the noise does not occur, and the second signal level L2 of the lock signal S2 indicates the noise occurs. The noise S1 occurs during a period T3. The lock signal S2 changes from the first signal level L1 to the second signal level L2 at time t1. The source driver circuit 114 feeds back the lock signal S2 with the second signal level L2 to the timing controller circuit 112 to inform the timing controller circuit 112 that the noise S1 occurs.

After receiving the lock signal S2 with the second signal level L2, the timing controller circuit 112 adjusts the data depth of the image data D from a first data depth D1 to a second data depth D2 during the active period of the frame period T1. The first data depth D1 is larger than the second data depth D2. For example, the timing controller circuit 112 may adjust the data depth of the image data D from 8 bits to 6 bits, or from 10 bits to 8 bits. In an embodiment, the timing controller circuit 112 may adjust the data depth of the image data D during the V-blanking period of the frame period T1.

The second data depth D2 is maintained for a predetermined period T2. For example, the second data depth D2 may be maintained for more than one frame periods T1. That is, the predetermined period T2 is larger than one frame period T1. The predetermined period T2 can be determined by a frame counter of the timing controller circuit 112. Next, the timing controller circuit 112 recovers the data depth of the image data D from the second data depth D2 to the first data depth D1 during the V-blanking period of the frame period T1. For example, the data depth of the image data D is recovered from the second data depth D2 to the first data depth D1 at the time t2 during the V-blanking period. In an embodiment, the timing controller circuit 112 may recover the data depth of the image data D during the active period of the frame period T1.

Figure 4:
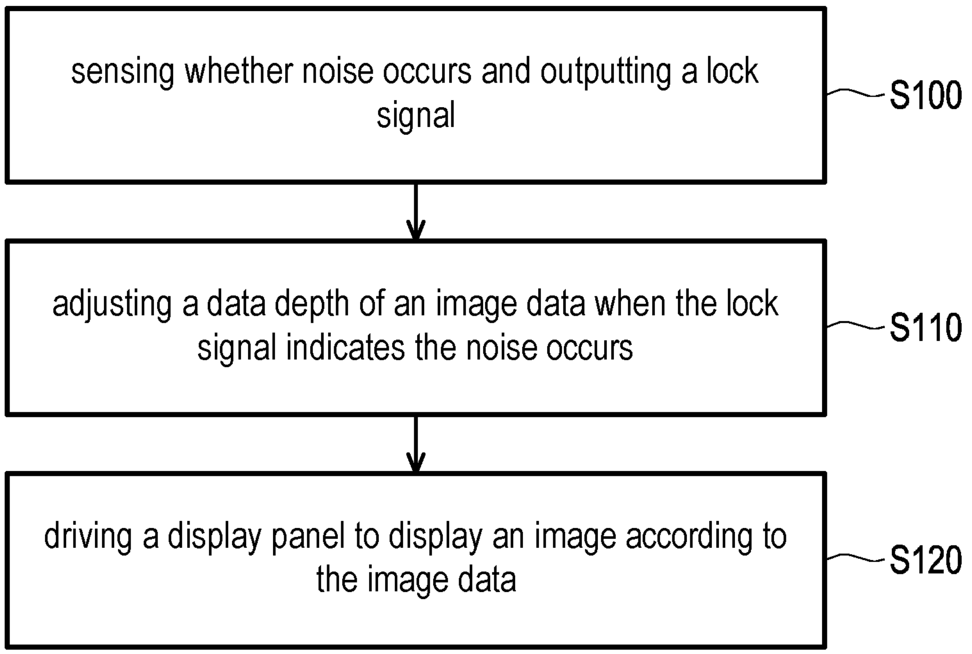
FIG. 4 is a flowchart illustrating a method for driving a display panel according to an embodiment of the invention.

FIG. 4 is a flowchart illustrating a method for driving a display panel according to an embodiment of the invention. Referring to FIG. 3 and FIG. 4, the driving method of the present embodiment is at least adapted to the display device 100 depicted in FIG. 1, but the invention is not limited thereto. The timing controller circuit 112 adjusts the data depth of the image data D when the lock signal S2 indicates the noise S1 occurs.

Taking the display device 100 for example, in step S100, the source driver circuit 114 senses whether the noise S1 occurs and outputs the lock signal S2. In step S110, the timing controller circuit 112 adjusts the data depth of the image data D when the lock signal S2 indicates the noise S1 occurs. In step S120, the source driver circuit 114 drives the display panel 120 to display an image according to the image data D.

The driving method of the display device described in the embodiment of the invention is sufficiently taught, suggested, and embodied in the embodiments illustrated in FIG. 1 to FIG. 3, and therefore no further description is provided herein.

Figure 5:
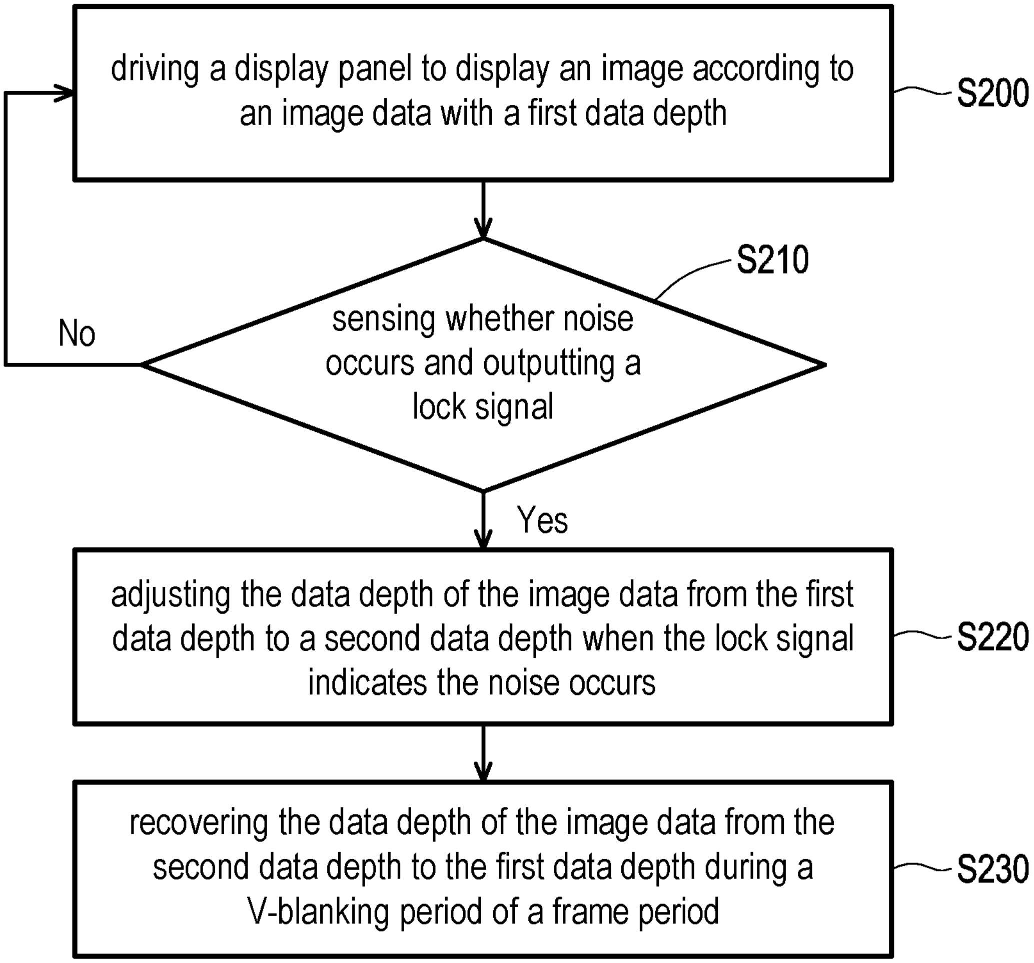
FIG. 5 is a flowchart illustrating a method for driving a display panel according to another embodiment of the invention.

FIG. 5 is a flowchart illustrating a method for driving a display panel according to another embodiment of the invention. Referring to FIG. 3 and FIG. 5, the driving method of the present embodiment is at least adapted to the display device 100 depicted in FIG. 1, but the invention is not limited thereto. The timing controller circuit 112 adjusts the data depth of the image data D when the lock signal S2 indicates the noise S1 occurs.

Taking the display device 100 for example, in step S200, the source driver circuit 114 drives the display panel 120 to display an image according to the image data D with the first data depth D1. In step S210, the source driver circuit 114 senses whether the noise S1 occurs and outputs the lock signal S2 to the timing controller circuit 112. When the noise S1 occurs at time t1, the source driver circuit 114 outputs the lock signal S2 having the second signal level L2 to the timing controller circuit 112 to inform the timing controller circuit 112 that the noise S1 occurs. The flow goes to step S220.

In step S220, the timing controller circuit 112 adjusts the data depth of the image data D from the first data depth D1 to the second data depth D2 when the lock signal S2 indicates the noise occurs. The second data depth D2 is maintained for the predetermined period T2. Next, in step S230, the timing controller circuit 112 recovers the data depth of the image data D from the second data depth D2 to the first data depth D1 during the V-blanking period of the frame period T1.

On the other hand, when the noise S1 does not occur, the source driver circuit 114 outputs the lock signal S2 having the first signal level L1 to the timing controller circuit 112 to inform the timing controller circuit 112 that the noise S1 does not occur. The flow returns to step S200. The timing controller circuit 112 does not adjust the data depth of the image data D when the lock signal S2 indicates the noise S1 does not occur. The source driver circuit 114 continues to drive the display panel 120 to display the image according to the image data D with the first data depth D1.

The driving method of the display device described in the embodiment of the invention is sufficiently taught, suggested, and embodied in the embodiments illustrated in FIG. 1 to FIG. 4, and therefore no further description is provided herein.

Figure 6:
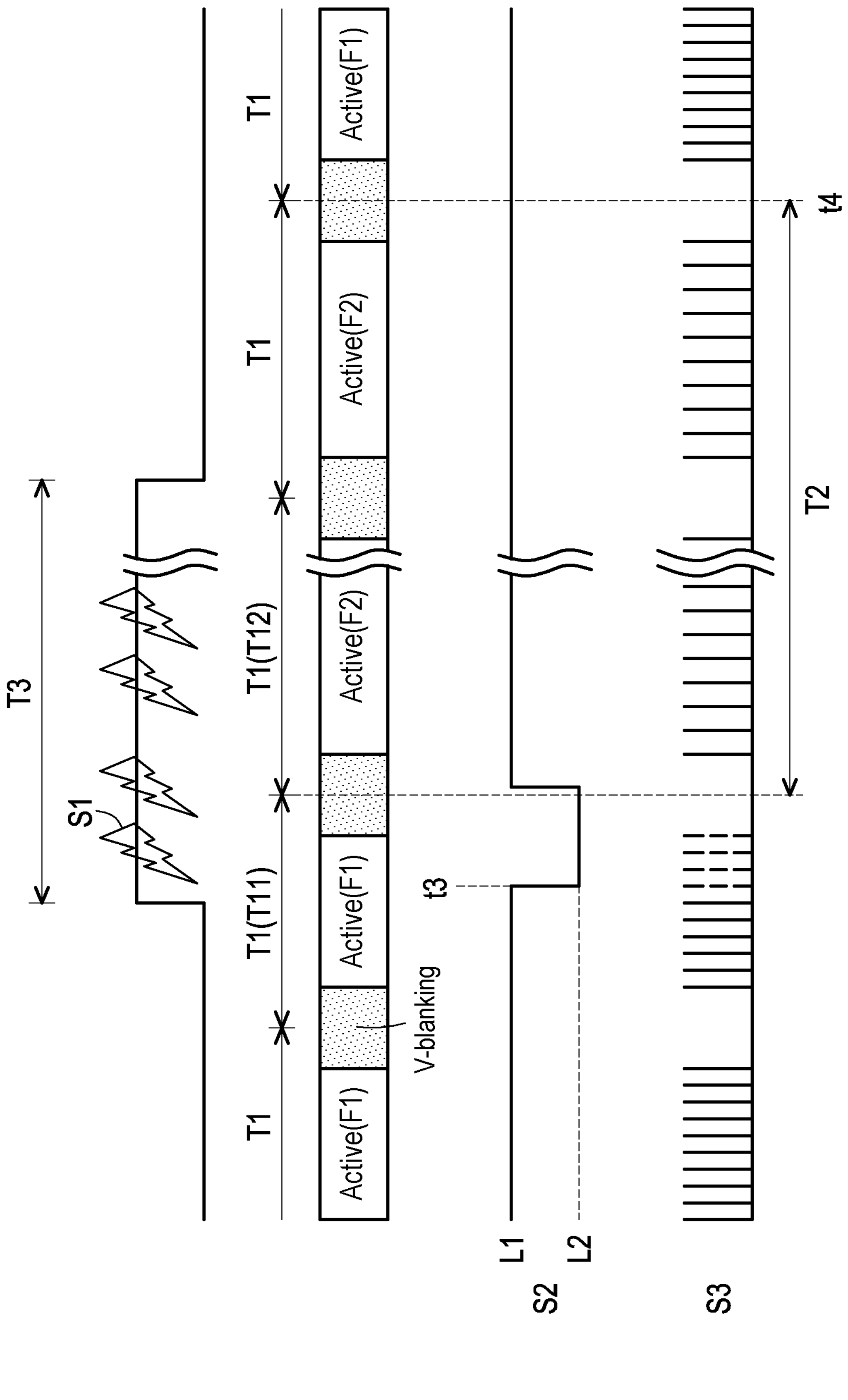
FIG. 6 is a schematic diagram illustrating signals and data of a display driving circuit according to another embodiment of the invention.

FIG. 6 is a schematic diagram illustrating signals and data of a display driving circuit according to another embodiment of the invention. Referring to FIG. 6, the timing controller circuit 112 outputs scan signals S3 to GOA (gate on array) circuits of the display panel 120. The scan signals S3 are configured to drive scan lines of the display panel 120. In the present embodiment, the timing controller circuit 112 adjusts the frame rate of the display panel 120 from a first frame rate F1 to a second frame rate F2 when the lock signal S2 indicates the noise S1 occurs.

To be specific, the frame rate of the display panel 120 during the first frame period T11 is the first frame rate F1, and the frame rate of the display panel 120 during the second frame period T12 is the second frame rate F2. The second frame period T12 is next to the first frame period T11, and the first frame rate F1 is larger than the second frame rate F2. The noise S1 may occur during the period T3, and the lock signal S2 changes from the first signal level L1 to the second signal level L2 at time t3 to indicate the noise S1 occurs. The timing controller circuit 112 stops outputting the scan signals S3 at time t3. The timing controller circuit 112 adjusts the frame rate of the display panel 120 from the first frame rate F1 to the second frame rate F2 during the second frame period T12.

The second frame rate F2 is maintained for a predetermined period T2, and the predetermined period T2 is determined by the timing controller circuit 112. For example, the second frame rate F2 may be maintained for more than one frame periods T1. That is, the predetermined period T2 is larger than one frame period T1.

Next, the timing controller circuit 112 recovers the frame rate of the display panel 120 from the second frame rate F2 to the first frame rate F1 during the V-blanking period of the frame period T1. For example, the frame rate of the display panel 120 is recovered from the second frame rate F2 to the first frame rate F1 at the time t4 during the V-blanking period.

Figure 7:
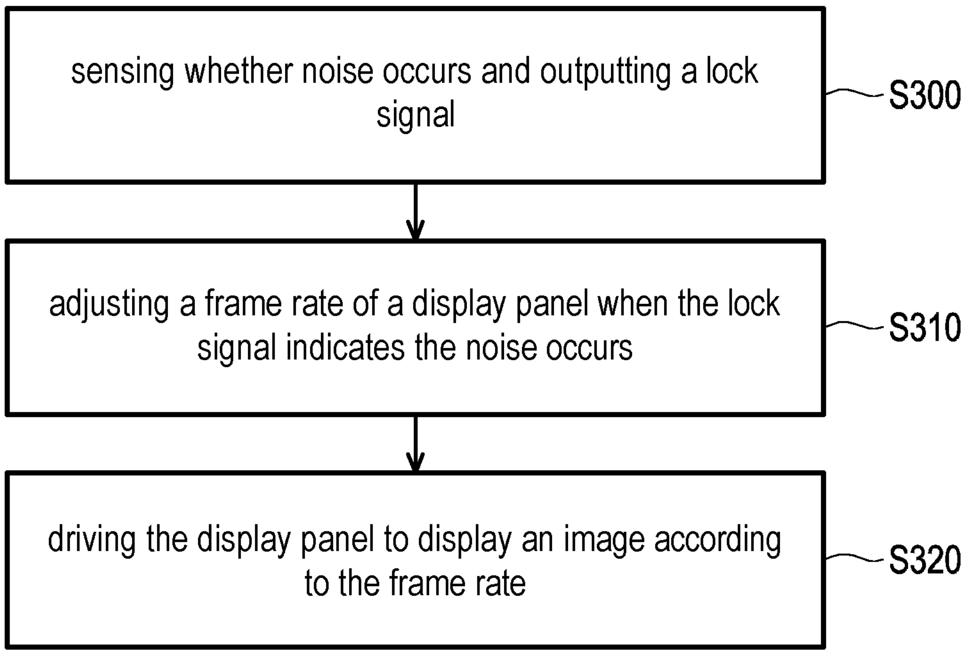
FIG. 7 is a flowchart illustrating a method for driving a display panel according to an embodiment of the invention.

FIG. 7 is a flowchart illustrating a method for driving a display panel according to an embodiment of the invention. Referring to FIG. 6 and FIG. 7, the driving method of the present embodiment is at least adapted to the display device 100 depicted in FIG. 1, but the invention is not limited thereto. The timing controller circuit 112 adjusts the frame rate of the display panel 120 when the lock signal S2 indicates the noise S1 occurs.

Taking the display device 100 for example, in step S300, the source driver circuit 114 senses whether the noise S1 occurs and outputs the lock signal S2. In step S310, the timing controller circuit 112 adjusts the frame rate of the display panel 120 when the lock signal S2 indicates the noise S1 occurs. In step S320, the source driver circuit 114 drives the display panel 120 to display an image according to the frame rate, e.g. the second frame rate F2.

The driving method of the display device described in the embodiment of the invention is sufficiently taught, suggested, and embodied in the embodiments illustrated in FIG. 1, FIG. 2 and FIG. 6, and therefore no further description is provided herein.

Figure 8:
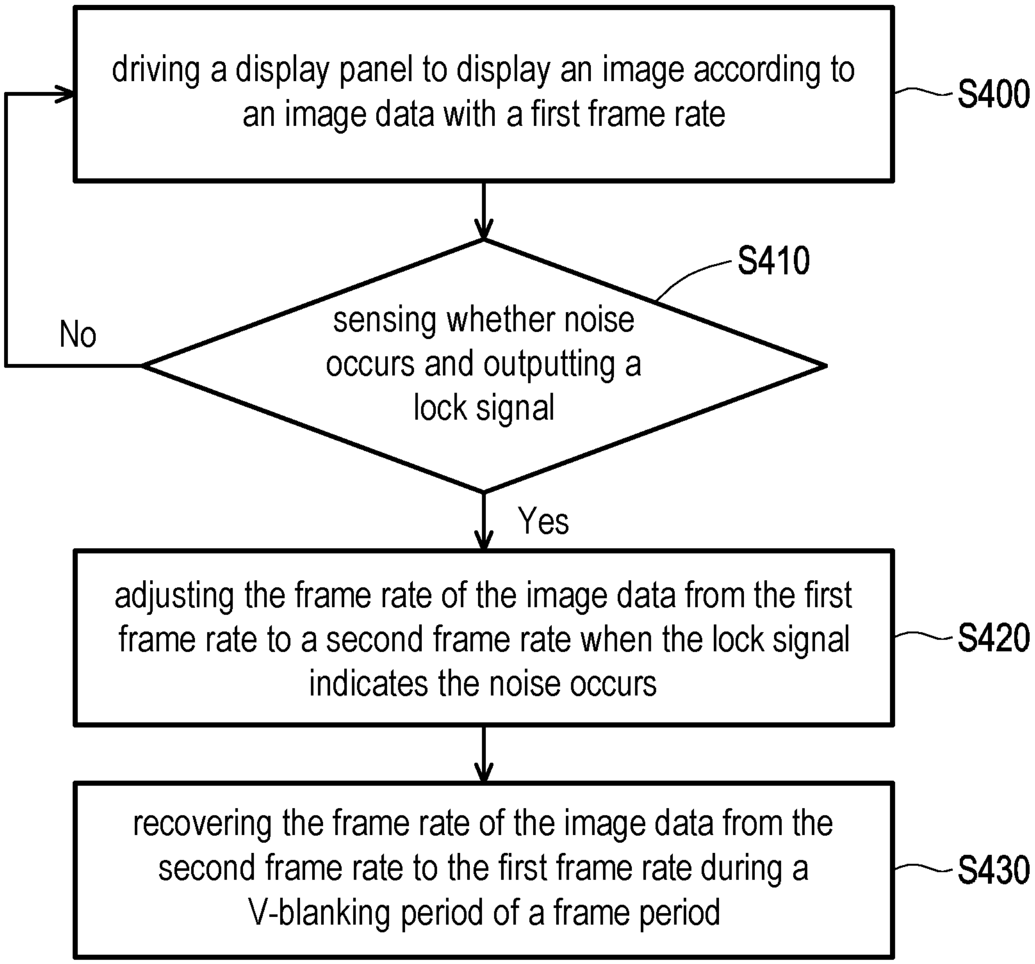
FIG. 8 is a flowchart illustrating a method for driving a display panel according to another embodiment of the invention.

FIG. 8 is a flowchart illustrating a method for driving a display panel according to another embodiment of the invention. Referring to FIG. 6 and FIG. 8, the driving method of the present embodiment is at least adapted to the display device 100 depicted in FIG. 1, but the invention is not limited thereto. The timing controller circuit 112 adjusts the frame rate of the display panel 120 when the lock signal S2 indicates the noise S1 occurs.

Taking the display device 100 for example, in step S400, the source driver circuit 114 drives the display panel 120 to display an image according to the image data D with the first frame rate F1. In step S410, the source driver circuit 114 senses whether the noise S1 occurs and outputs the lock signal S2 to the timing controller circuit 112. When the noise S1 occurs at time t3, the source driver circuit 114 outputs the lock signal S2 having the second signal level L2 to the timing controller circuit 112 to inform the timing controller circuit 112 that the noise S1 occurs. The flow goes to step S420.

In step S420, the timing controller circuit 112 adjusts the frame rate of the display panel 120 from the first frame rate F1 to the second frame rate F2 when the lock signal S2 indicates the noise occurs. The second frame rate F2 is maintained for the predetermined period T2. Next, in step S430, the timing controller circuit 112 recovers the frame rate of the display panel 120 from the second frame rate F2 to the first frame rate F1 during the V-blanking period of the frame period T1.

On the other hand, when the noise S1 does not occur, the source driver circuit 114 outputs the lock signal S2 having the first signal level L1 to the timing controller circuit 112 to inform the timing controller circuit 112 that the noise S1 does not occur. The flow returns to step S400. The timing controller circuit 112 does not adjust the frame rate of the display panel 120 when the lock signal S2 indicates the noise S1 does not occur. The source driver circuit 114 continues to drive the display panel 120 to display the image according to the image data D with the first frame rate F1.

The driving method of the display device described in the embodiment of the invention is sufficiently taught, suggested, and embodied in the embodiments illustrated in FIG. 1, FIG. 2, FIG. 6 and FIG. 7, and therefore no further description is provided herein.

In summary, in the embodiment of the invention, when the noise is detected, the timing controller circuit dynamically adjusts the data depth or the frame rate to improve the signal quality and increase the signal-to-noise ratio. When the noise disappears, the data depth or the frame rate return to the initial setting. Therefore, the issue of external noise interference can be solved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display driving circuit, adapted to drive a display panel to display an image, the display driving circuit comprising:

a source driver circuit, configured to sense whether noise occurs and output a lock signal, wherein the lock signal indicates whether the noise occurs; and a timing controller circuit, coupled to the source driver circuit, and configured to output image data to the source driver circuit and receive the lock signal from the source driver circuit, wherein the timing controller circuit adjusts a data depth of the image data or a frame rate of the display panel when the lock signal indicates that the noise occurs, wherein the timing controller circuit adjusts the data depth of the image data from a first data depth to a second data depth during an active period of a frame period, wherein the first data depth is larger than the second data depth, wherein the timing controller circuit recovers the data depth of the image data from the second data depth to the first data depth during a V-blanking period of the frame period.

2. The display driving circuit of claim 1, wherein the second data depth is maintained for a predetermined period, and the predetermined period is determined by the timing controller circuit.

3. The display driving circuit of claim 1, wherein the lock signal comprises a first signal level and a second signal level, and the second signal level is lower than the first signal level, wherein the first signal level of the lock signal indicates that the noise does not occur, and the second signal level of the lock signal indicates that the noise occurs.

4. A display driving circuit, adapted to drive a display panel to display an image, the display driving circuit comprising:

a source driver circuit, configured to sense whether noise occurs and output a lock signal, wherein the lock signal indicates whether the noise occurs; and a timing controller circuit, coupled to the source driver circuit, and configured to output image data to the source driver circuit and receive the lock signal from the source driver circuit, wherein the timing controller circuit adjusts a frame rate of the display panel when the lock signal indicates that the noise occurs, wherein the timing controller circuit adjusts the frame rate of the display panel from a first frame rate to a second frame rate during a next frame period, wherein the first frame rate is larger than the second frame rate, wherein the timing controller circuit recovers the frame rate of the display panel from the second frame rate to the first frame rate during a V-blanking period of the frame period.

5. The display driving circuit of claim 4, wherein the second frame rate is maintained for a predetermined period, and the predetermined period is determined by the timing controller circuit.

6. A method for driving a display panel, the method comprising steps of:

sensing whether noise occurs and outputting a lock signal, wherein the lock signal indicates whether the noise occurs;

adjusting a data depth of an image data when the lock signal indicates that the noise occurs, wherein the data depth of the image data is adjusted from a first data depth to a second data depth during an active period of a frame period, wherein the first data depth is larger than the second data depth;

recovering the data depth of the image data from the second data depth to the first data depth during a V-blanking period of the frame period; and driving the display panel to display an image according to the image data.

7. The method for driving the display panel of claim 6, wherein the second data depth is maintained for a predetermined period, and the predetermined period is determined by a timing controller circuit.

8. The method for driving the display panel of claim 6, further comprising:

not adjusting the data depth of the image data when the lock signal indicates that the noise does not occur.

9. The method for driving the display panel of claim 6, wherein the lock signal comprises a first signal level and a second signal level, and the second signal level is lower than the first signal level, wherein the first signal level of the lock signal indicates that the noise does not occur, and the second signal level of the lock signal indicates that the noise occurs.

10. A method for driving a display panel, the method comprising steps of:

sensing whether noise occurs and outputting a lock signal, wherein the lock signal indicates whether the noise occurs;

adjusting a frame rate of the display panel when the lock signal indicates that the noise occurs, wherein the frame rate of the display panel is adjusted from a first frame rate to a second frame rate during a next frame period, wherein the first frame rate is larger than the second frame rate;

recovering the frame rate of the display panel from the second frame rate to the first frame rate during a V-blanking period of the frame period; and driving the display panel to display an image according to the frame rate.

11. The method for driving the display panel of claim 10, wherein the second frame rate is maintained for a predetermined period, and the predetermined period is determined by a timing controller circuit.

12. The method for driving the display panel of claim 10, further comprising:

not adjusting the frame rate of the display panel when the lock signal indicates that the noise does not occur.

13. The method for driving the display panel of claim 10, wherein the lock signal comprises a first signal level and a second signal level, and the second signal level is lower than the first signal level, wherein the first signal level of the lock signal indicates that the noise does not occur, and the second signal level of the lock signal indicates that the noise occurs.

* * * * *